United States Patent [19]

Wetzel et al.

[11] Patent Number: 4,617,075
[45] Date of Patent: Oct. 14, 1986

[54] METHOD OF MAKING A BELT

[75] Inventors: Robert E. Wetzel; Richard L. Marsh, both of Springfield, Mo.

[73] Assignee: Dayco Corporation, Dayton, Ohio

[21] Appl. No.: 658,832

[22] Filed: Oct. 9, 1984

[51] Int. Cl.$^4$ .......................... B29H 7/22; F16G 1/00
[52] U.S. Cl. .................................... 156/137; 156/138; 474/250
[58] Field of Search ............... 156/137, 138, 139, 140, 156/141, 86.25, 311; 474/205, 250

[56] References Cited

U.S. PATENT DOCUMENTS

| 3,078,206 | 2/1963 | Skura | 156/140 |
| 3,250,653 | 5/1966 | Geist et al. | 156/138 |
| 3,535,946 | 10/1970 | Miller | 74/232 |
| 4,235,119 | 11/1980 | Wetzel | 474/205 |
| 4,343,666 | 8/1982 | Wetzel | 156/138 |
| 4,414,047 | 11/1983 | Wetzel et al. | 156/138 |
| 4,445,879 | 5/1984 | Cicognani | 474/205 |

Primary Examiner—Michael Ball
Attorney, Agent, or Firm—Joseph V. Tassone

[57] ABSTRACT

A belt construction and method of making the same are provided, the belt construction having opposed sides and comprising a plurality of teeth defining one of the opposed sides of the belt construction and being mainly formed of a first polymeric material that has reinforcing fibers therein, each tooth having opposed sides that are disposed in spaced relation to adjacent sides of adjacent teeth, the belt construction having a land area between adjacent teeth, and a backing member defining the other of the opposed sides of the belt construction, the backing member being mainly formed from a second polymeric material that is initially separate from the material of the teeth. The method comprises the steps of providing a grooved drum, disposing the first polymeric material in a non-cured form thereof about the drum, then subjecting the drum to heat and pressure to cause the first material to be forced toward the drum and exude into the grooves to at least partially form the teeth, then substantially immediately cooling the first material and the drum to stop the curing of the first material so that the first material is generally in a non-cured condition, then disposing the second material in a non-cured form thereof about the first material on the drum, and then again subjecting the drum to heat and pressure to cause the first and second material to be forced toward the drum to complete any remaining unfinished portion of the teeth and be cured together to form the belt construction.

11 Claims, 10 Drawing Figures

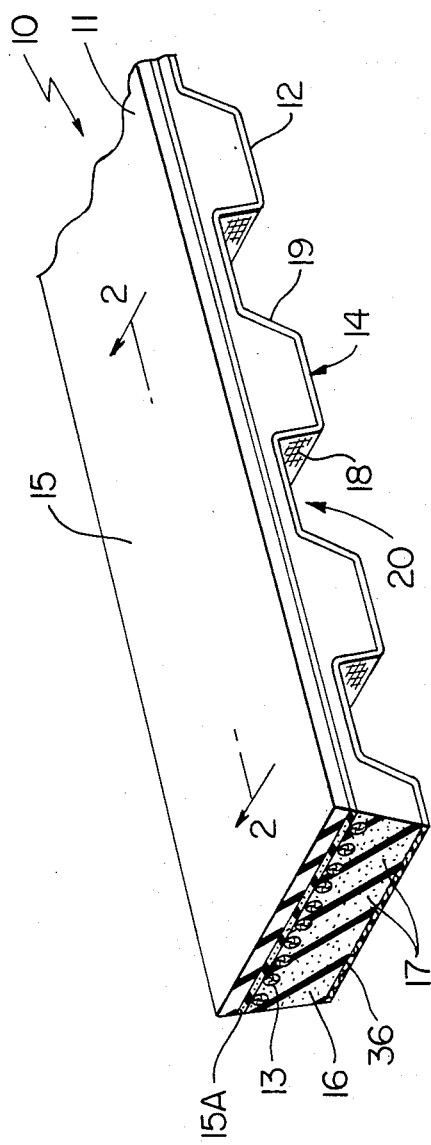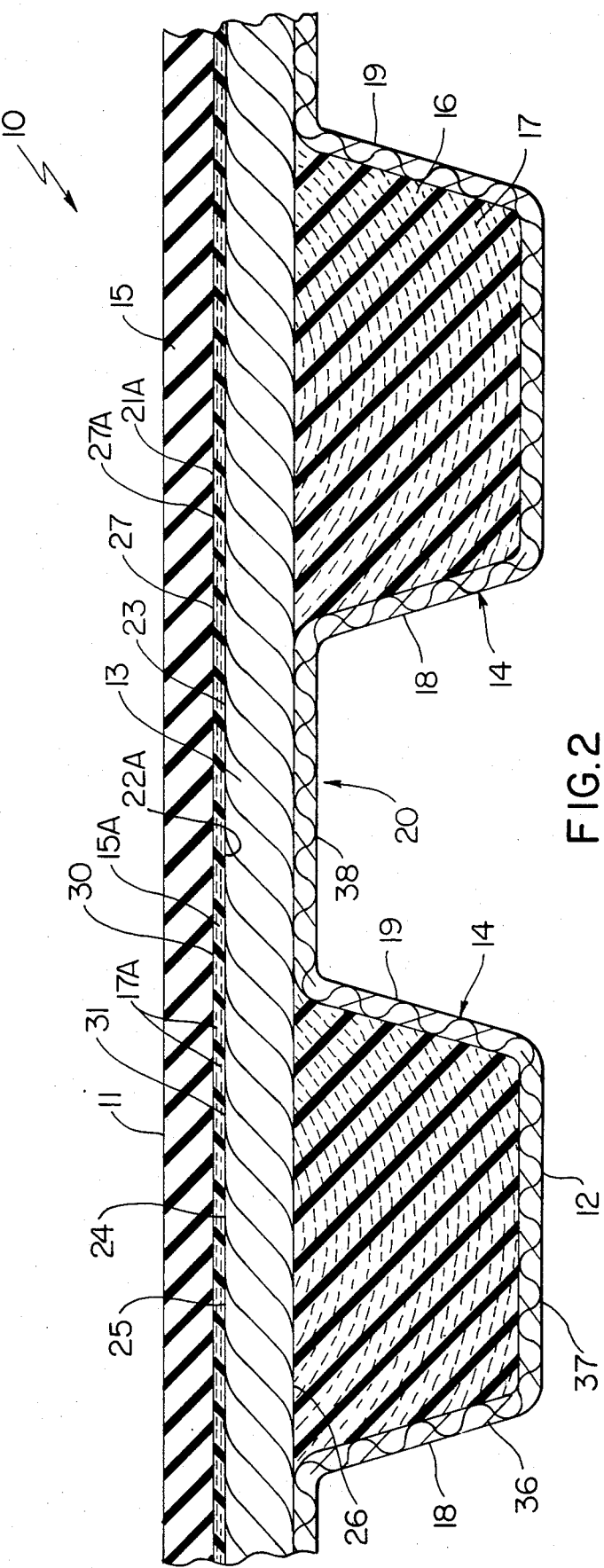

METHOD OF MAKING A BELT

BACKGROUND OF THE INVENTION

1. Field of the Invention

This invention relates to an improved belt construction and to a method of making the same.

2. Prior Art Statement

It is known to make a belt construction having opposed sides and comprising a plurality of teeth defining one of the opposed sides of the belt construction and being mainly formed of a first polymeric material that has reinforcing fibers therein, each tooth having opposed sides that are disposed in spaced relation to adjacent sides of adjacent teeth, the belt construction having a land area between adjacent teeth, and a backing member defining the other of the opposed sides of the belt construction, the backing member being mainly formed from a second polymeric material that is initially separate from the material of the teeth, the method comprising the steps of providing a grooved drum, disposing the first polymeric material in a non-cured form thereof about the drum and then subjecting the drum with the first material thereon to heat and pressure to cause the first material to be forced toward the drum and exude into the grooves to at least partially form the teeth. For example, see the U.S. Patent to Skura, U.S. Pat. No. 3,078,206 and the U.S. Patent to Miller, U.S. Pat. No. 3,535,946.

It is also known to form toothed belt constructions in separate stages on a grooved drum. For example, see the U.S. Patent to Geist et al, U.S. Pat. No. 3,250,653; and the U.S. Patent to Wetzel, U.S. Pat. No. 4,235,119.

While certain of the above-mentioned items form the various layers of a toothed belt construction of different polymeric materials, also see the U.S. Patent to Cicognani, U.S. Pat. No. 4,445,879 for another such multi-layered toothed belt construction.

SUMMARY OF THE INVENTION

It is one feature of this invention to provide an improved toothed belt construction wherein the polymeric material forming the teeth thereof is effectively bonded to the polymeric material forming the backing member thereof while having fully formed teeth.

In particular, it was found according to the teachings of this invention that when forcing under heat and pressure a non-cured polymeric material that has reinforcing fiber members therein into the grooves of a grooved drum to form the teeth of a toothed belt construction, it was desired to prevent that material from substantially curing during such forming operation so that the same will subsequently effectively bond to the polymeric material of a backing member subsequently disposed thereagainst and permit the backing material to be forced toward the drum with sufficient heat and pressure to completely form the teeth in the grooves of the drum.

It was found according to the teachings of this invention that such curing could be substantially eliminated if substantially immediately after the step of subjecting the drum to heat and pressure to cause the first polymeric material to be forced toward the drum and exude into the grooves to at least partially form the teeth, the first material and the drum are cooled to stop the curing of the first material so that the first material is generally in a non-cured condition when the second material in a non-cured form thereof is disposed about the drum and subsequently subjected to heat and pressure.

For example, one embodiment of this invention provides a method of making a belt construction having opposed sides and comprising a plurality of teeth defining one of the opposed sides of the belt construction and being mainly formed of a first polymeric material that has reinforcing fibers therein, each tooth having opposed sides that are disposed in spaced relation to adjacent sides of adjacent teeth, the belt construction having a land area between adjacent teeth, and a backing member defining the other of the opposed sides of the belt construction, the backing member being mainly formed from a second polymeric material that is initially separate from the material of the teeth, the method comprising the steps of providing a grooved drum, disposing the first polymeric material in a non-cured form thereof about the drum, then subjecting the drum with the first material thereon to heat and pressure to cause the first material to be forced toward the drum and exude into the grooves to at least partially form the teeth, then substantially immediately force cooling the first material and the drum to a certain temperature to stop the curing of the first material so that the first material is generally in a less cured condition thereof than a cured condition thereof if the drum with the first material thereon had been permitted to cool to the certain temperature at a normal rate by being disposed in substantially static air of substantially normal room temperature, then disposing the second material in a non-cured form thereof about the first material on the drum, and then subjecting the drum with the first and second materials thereon to heat and pressure to cause the first and second materials to be forced toward the drum to complete any remaining unfinished portion of the teeth and be cured together to form the belt construction.

Accordingly, it is an object of this invention to provide an improved belt construction having one or more of the novel features of this invention as set forth above or hereinafter shown or described.

Another object of this invention is to provide an improved method of making such a belt construction, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 1 is a fragmentary perspective view of the improved belt construction of this invention.

FIG. 2 is an enlarged, fragmentary cross-sectional view of the belt construction of FIG. 1 and is taken on the line 2—2 thereof.

DESCRIPTION OF THE PREFERRED EMBODIMENT

Figure 3:
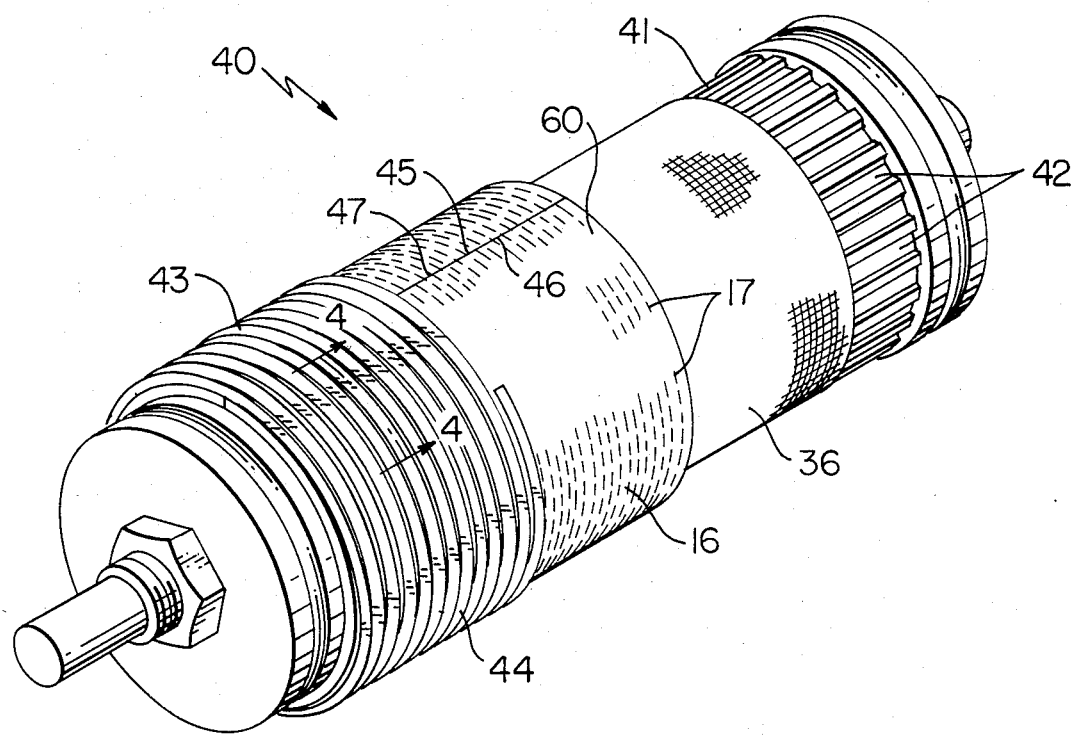
FIG. 3 is a schematic broken-away perspective view illustrating part of the apparatus and method of this invention for forming the belt construction of FIG. 1.

While the various features of this invention are hereinafter illustrated and described as being particularly adapted to provide a toothed belt construction formed of particular materials and with a particular tooth profile, it is to be understood that the various features of this invention can be utilized singly or in various combinations thereof to provide belt constructions formed of other materials and with other tooth profiles as desired.

Further, while the various features of this invention are hereinafter illustrated and described as being particularly adapted to provide a belt construction in sleeve form which is adapted thereafter to be cut into individual endless belts in a conventional manner, it is to be understood that the various features of this invention can be utilized singly or in various combinations thereof to provide a belt construction which itself merely comprises one endless belt, if desired.

Therefore, this invention is not to be limited to only the embodiment illustrated in the drawings, because the drawings are merely utilized to illustrate one of the wide variety of uses of this invention.

Referring now to FIGS. 1 and 2, the improved belt construction of this invention is generally indicated by the reference numeral 10, the belt construction 10 having opposed sides 11 and 12 and comprising a tensile section or means 13 disposed intermediate the opposed sides 11 and 12, a plurality of teeth that are generally indicated by the reference numeral 14 and defining the side 12 of the belt construction 10, and a backing member 15 defining the side 11 of the belt construction 10. If desired an intermediate relatively thin layer 15A can be disposed between the backing member 15 and the tensile means 13.

While the tensile section or means 13 of the belt construction 10 can comprise any suitable structure, the embodiment thereof illustrated in the drawings comprises a plurality of side-by-side cords or strands formed of a suitable substantially non-stretchable material in a manner conventional in the belt-making art as will be apparent hereinafter and therefore the terms "tensile means" will be hereinafter utilized for describing the tensile section 13 of the belt construction 10.

The teeth 14 of the belt construction 10 are mainly formed of a first polymeric material 16 that has reinforcing fibers 17 therein, each tooth 14 having opposed sides 18 and 19 that are disposed in spaced relation to adjacent sides 19 and 18 of adjacent teeth 14. The sides 18 and 19 of each tooth 14 are shown as being flat and angled relative to the longitudinal axis of the belt construction 10 that is disposed parallel to the tensile means 13 and can comprise the driving or driven parts of the teeth 14 in a manner well known in the art. However, it is to be understood that the cross-sectional configuration of the teeth 14 can have any other suitable profile rather than being substantially trapezoidal as illustrated in FIGS. 1 and 2, if desired.

The belt construction 10 has land areas that are generally indicated by the reference numeral 20 in FIGS. 1 and 2 and are respectively disposed between adjacent teeth 14 as is conventional in the art.

The intermediate layer 15A of the belt construction 10 is mainly formed from a polymeric material 21A that is initially separate from the material 16 of the teeth 14 and has reinforcing fibers 17A therein as illustrated in the drawings, the material 21A of the layer 15A having a surface 22A that joins with a surface 23 of each tooth 14 whereby the joining surfaces 22A and 23 define an interface line 24 therebetween that is substantially coplanar with the surface 25 of the tensile means 13 but may dip into the medial portion of each tooth 14 in a manner similar to the interface line for each tooth of the belt construction set forth in the aforementioned U.S. Patent to Wetzel, U.S. Pat. No. 4,235,119 and applicants' copending patent application, Ser. No. 502,777, filed June 9, 1983, whereby this patent and this copending patent application are being incorporated into this disclosure by this reference thereto.

The surface 22A of the layer 15A also joins with a surface 30 of the first material 16 in each land area 20 whereby the joining surfaces 22A and 30 in each land area 30 define an interface line 31 therebetween that is also substantially coplanar with the surface 25 of the tensile means 13.

However, it is to be understood that the interface line 31 in each land area 20 of the belt construction 10 of this invention can be disposed substantially adjacent the side 25 of the tensile means 13 as illustrated in FIG. 2 or could extend spaced from that side 25 toward the side 11 of the belt construction of FIG. 1 as in the aforementioned copending patent application, Ser. No. 502,777, filed June 9, 1983, or be disposed intermediate the two sides 25 and 26 of the tensile means 13 depending upon the original thickness of the first material 16 utilized to form the belt construction 10 as will be apparent hereinafter. In this same vein, the interface line 24 between the materials 16 and 21A in the medial portion 27 of each tooth 14 could be disposed completely intermediate the sides 25 and 26 of the tensile means 13, be substantially even with the side 25 of the tensile means 13 or be intermediate the side 25 of the tensile means 13 and the side 11 of the belt construction 10, again depending upon the initial thickness of the material 16 being utilized and the degree of completeness of the teeth 14 during a first forming step of applying heat and pressure to initially form the teeth 14 as will be apparent hereinafter.

In any event, it can be seen that the interface line 24 for each tooth 14 of the belt construction 10 of this invention, as well as the interface line 31 for each land area 20 of the belt construction 10, is disposed spaced from the side 26 of the tensile means 13 so as to tend to remove any tendency of a shearing effect to take place at the interface lines 24 and 31 along the side 26 of the tensile means 13 as the only portions of the interface lines 24 and 31 between the materials 16 and 21A that might actually cross the side 26 of the tensile means 13 would be disposed at an angle relative to the side 26 of the tensile means 13 in the medial portion of each tooth 14 and, thus, would tend to oppose any shearing forces being applied to the teeth 14 during the driving or driven operation of the belt construction 10 in a manner that is well known in the art.

Further, it can be seen that substantially the entire portion of the teeth 14 of the belt construction 10 disposed below the side 26 of the tensile means 13 have the reinforcing fibers 17 therein which tend to prevent and/or oppose a shearing force from shearing the teeth 14 from the belt construction 10. Thus, such a belt construction 10 is particularly adapted for being a synchronous belt as will be apparent hereinafter.

The backing member 15 of the belt construction 10 is mainly formed from a second polymeric material 21 that is initially separate from the materials 21A and 16 and can be substantially free of reinforcing fibers therein, if desired, as illustrated in the drawings, the material 21 of the backing member 15 having a surface 27 that joins with a surface 27A of the layer 15A and will follow that even contour the layer 15A takes in its joining with the first polymeric material 16 in the land area 20 and the teeth 14 as previously set forth.

If desired, a conventional reinforcing fabric material 36 can be utilized to cover the opposed sides 18 and 19 of each tooth 14 as well as cover the bottom surface 37 of each tooth 14 and the bottom surface 38 of each land area 20 as illustrated in FIGS. 1 and 2.

The belt construction 10 illustrated in FIGS. 1 and 2 and previously described is formed by utilizing a method and apparatus of this invention that is similar to, but uniquely different from, the method and apparatus disclosed and described in the aforementioned U.S. Patent to Skura, U.S. Pat. No. 3,078,206 and the aforementioned U.S. Patent to Miller, U.S. Pat. No. 3,535,946 whereby these two patents are being incorporated into this disclosure by this reference thereto.

For example, reference is now made to FIGS. 3 and 4 wherein the method and apparatus of this invention for making the belt construction 10 of FIGS. 1 and 2 is generally indicated by the reference numeral 40 and comprises a metallic drum 41 that has a plurality of longitudinally disposed and spaced apart parallel grooves 42 therein in which the teeth 14 of the belt construction 10 are subsequently formed.

The grooved drum 41 is formed and utilized in substantially the same manner as set forth in the aforementioned Patent to Skura, U.S. Pat. No. 3,078,206 and therefore the details thereof need not be set forth.

When forming the belt construction 10 of this invention, the stretchable fabric cover 36 is first disposed or wrapped about the drum 41 with the opposed ends of the fabric cover 36 either being butt joined or overlapped as desired in a conventional manner.

Thereafter, a layer of the first polymeric material 16 in a non-cured form thereof is disposed or wrapped about the drum 41 on top of the cover 36 and has the opposed ends 45 and 46 thereof disposed in abutting relation as represented by the butt line 47 in FIG. 3.

Thereafter, a heat shrinkable tensile simulating means 43 is disposed on top of the first polymeric material 16 by suitably winding one or more cords 44 of the tensile simulating means 43 on the first polymeric material 16 with adjacent turns 44 of the tensile simulating means 43 being spaced from each other the desired distance or combination of distances, FIG. 3 merely being a schematic showing of such spacing which will correspond to the desired spacing for the particular tensile means 13 subsequently utilized for the belt construction 10 as will be apparent hereinafter.

While the fibers 17 in the polymeric material 16 can be randomly and homogeneously disposed therein, it is also possible that the fibers 17 can be oriented throughout the material 16 and in the embodiment illustrated in the drawings, the fibers 17 in the material 16 have been oriented so that their long dimensions will mainly extend in a direction between the opposed sides 18 and 19 of each tooth 14 as illustrated in FIG. 2 and, therefore, are disposed in a direction that is transverse to the longitudinal axis of the drum 41 as illustrated in FIG. 3.

Figure 4:
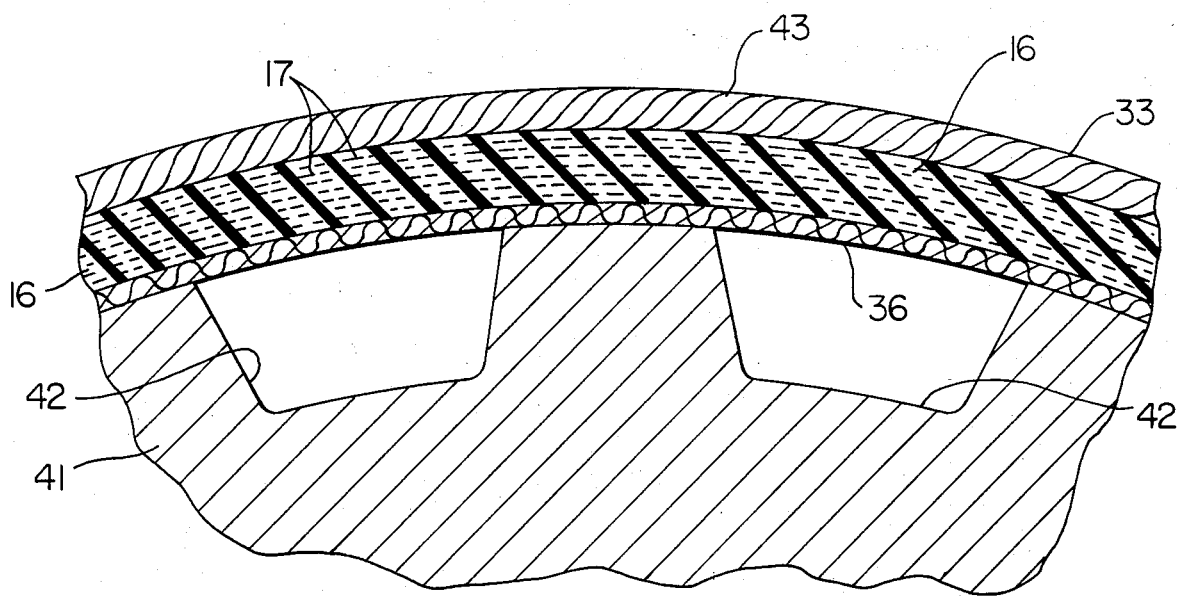
FIG. 4 is an enlarged fragmentary cross-sectional view taken on the line 4—4 of FIG. 3, FIG. 4 illustrating one step in the method of this invention for forming the belt construction of FIG. 1.
Figure 5:
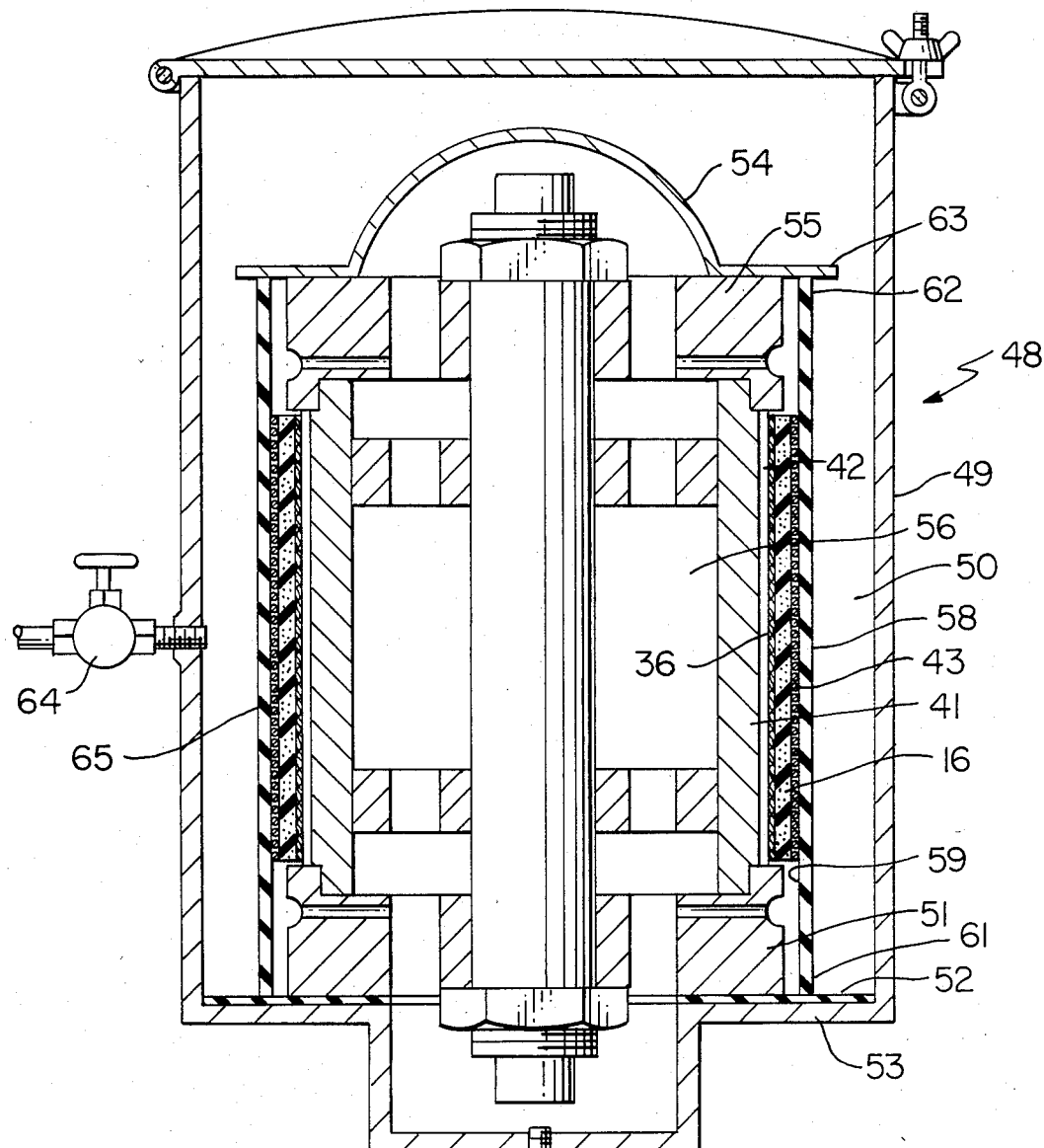
FIG. 5 is a cross-sectional view illustrating the apparatus of FIG. 3 disposed in another apparatus that applies heat and pressure to the apparatus of FIG. 3 in various steps to form the belt construction of this invention.

After the parts 36, 16 and 43 of the belt construction 10 have been disposed in the wrapped-around condition on the drum 41 as illustrated in FIGS. 3 and 4, such assembly is disposed in the apparatus that is generally indicated by the reference numeral 48 in FIG. 5 and comprises a container 49 having a chamber 50 therein. One end 51 of the drum 41 may rest against a resilient sealing gasket means 52 disposed on an end wall 53 of the container 49 and a removable cover member 54 is disposed against the other end 55 of the drum 41 so that the interior 56 of the drum 41 can have steam injected therein and/or be vented through a valve means 57. A flexible diaphragm 58 in cylinder form is disposed about the drum 41 and has its inner surface 59 disposed against the cord 43 and adjacent the outer surface 60 of the polymeric material 16 while its opposed ends 61 and 62 are respectively disposed in substantial sealing engagement with the end gasket 52 and an outwardly extending flange 63 of the cover means 54. In this manner, the flexible diaphragm 58 is adapted to force the cord 43 and material 16 toward the drum 41 when steam under a suitable pressure is directed into the chamber 50 of the container 49 through suitable valve means 64 to act on the exterior 65 of the diaphragm 58 in a manner fully set forth in the aforementioned Patent to Skura, U.S. Pat. No. 3,078,206.

Figure 8:
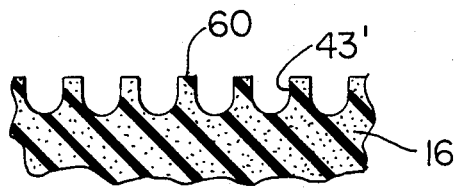
FIG. 8 is a fragmentary cross-sectional view taken on line 8—8 of FIG. 6 after the shrinkable cord means has been removed.
Figure 6:
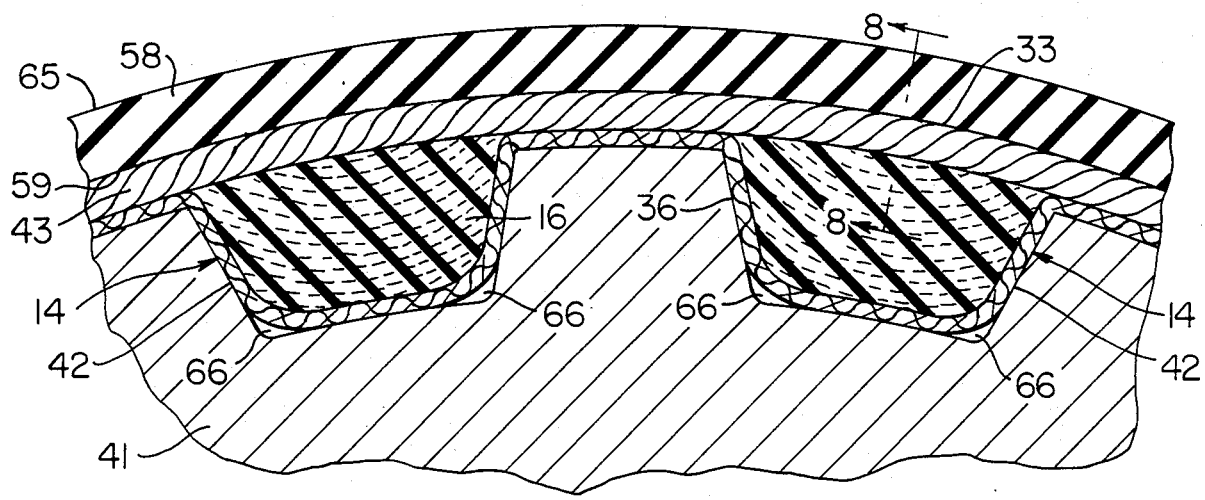
FIG. 6 is a view similar to FIG. 4 and illustrates the portion of the belt construction of this invention that has been formed from the arrangement illustrated in FIG. 4.

The steam that is directed into the interior 56 of the drum 41, if used, has a pressure value that is less than the pressure value of the steam that is directed into the chamber 50 through the valve means 64 so that the resulting pressure differential between the interior 56 and the exterior 50 of the diaphragm 58 causes the diaphragm 58 to force the cord 43 and material 16 toward the drum 41 and since the material 16, as well as the fabric 36, has been heated by the steam, the same exudes toward the drum 41 into the grooves 42 to at least partially form the teeth 14 in the manner illustrated in FIG. 6 wherein unfilled gaps 66 of the grooves 42 remain when the diaphragm 58 comes to rest against the top surface 33 of the cords 43 as illustrated in FIG. 6, the heat shrinkable cords 43 having been shrunk by the heat and having been embedded into the surface 60 of the polymeric material 16 as illustrated in FIGS. 6 and 8 thereby defining the location of the pitch line of the belt construction.

Figure 7:
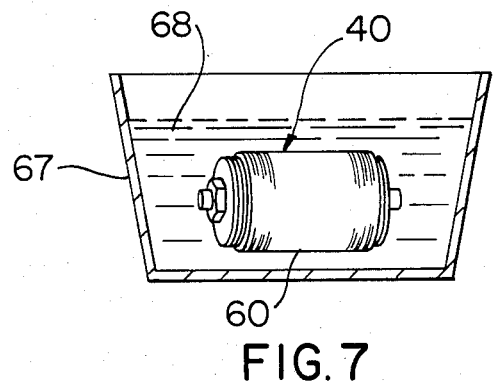
FIG. 7 is a schematic view illustrating how the drum and belt arrangement of FIG. 6 are cooled after the same have been removed from the apparatus of FIG. 5.

At this time, the heat required to permit the material 16 and cover 36 to exude into the grooves 42 of the drum 41 is sufficiently high so that the same will begin to cause the material 16 to begin to cure so that it is desired according to the teaching of this invention to substantially immediately cool the drum 41, material 16, cover 36 and cords 43 and this is accomplished by removing the drum 41 with the material 16, cords 43 and cover 36 in the condition illustrated in FIG. 6 and dispose the same in a cooling bath that is generally indicated by the reference numeral 67 in FIG. 7. The cooling bath 67 immediately reduces the temperature of the drum 41, material 16, cords 43 and cover 36 to at least a temperature where the aforementioned curing operation immediately stops so that the material 16, cords 43 and cover 36 will now be at generally a non-cured condition thereof.

For example, it is believed that the temperature of the material 16, cords 43, cover 36 and drum 41 can be lowered to approximately 140° F. to substantially stop the aforementioned curing operation. Of course, the temperature can be lowered to a temperature lower than 140 F., if desired.

While the bath 67 can have any suitable cooling fluid 68 therein, the same can comprise water that is normally maintained at room temperature.

Once the drum 41 and its associated means 16, 43 and 36 have been cooled in the above manner, the cord 43 is removed as illustrated in FIG. 8 and the water on the exterior surface 60 of the material 16 is removed in any suitable manner, such as by blowing hot air on the same, etc. In this manner, the surface 60 is sufficiently dried so that a subsequent securement of the layer of material 15A thereto can take place as will be apparent hereinafter.

The tensile means 13 is now laid into the resulting grooves 43' that had been formed in the surface 60 of the polymeric material 16 by the shrinkable cords 43.

Figure 9:
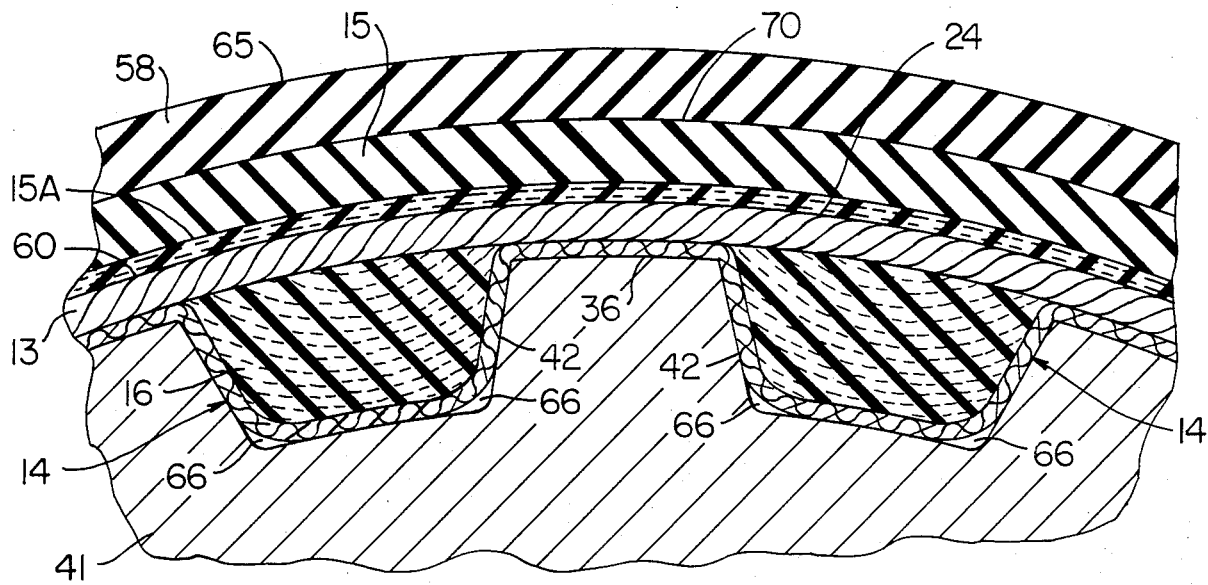
FIG. 9 is a view similar to FIG. 7 and illustrates another step in the method of this invention for forming the belt construction of FIG. 1.
Figure 10:
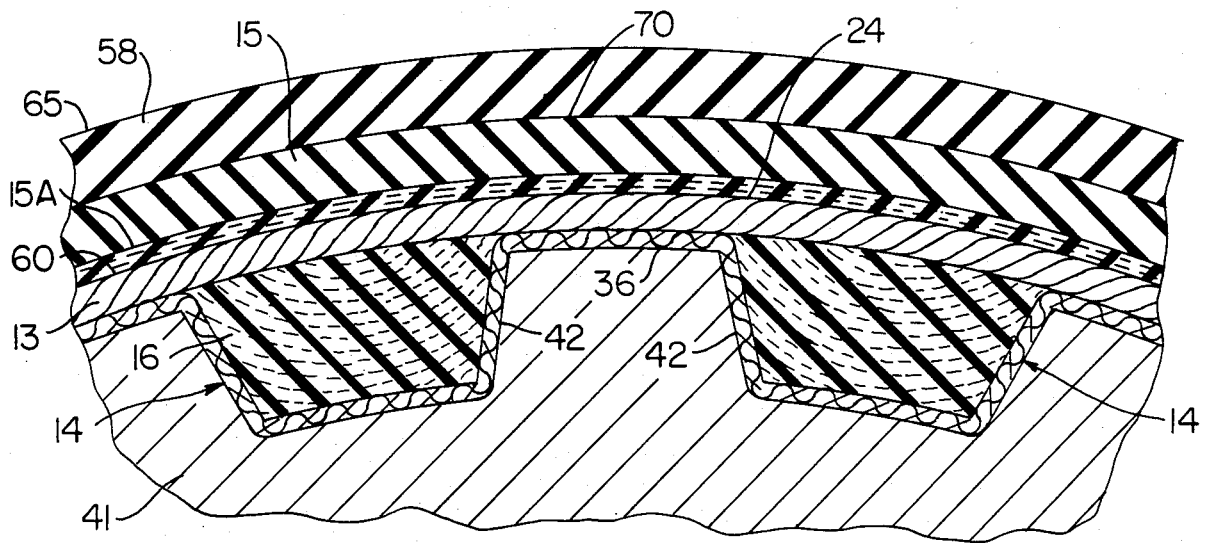
FIG. 10 is a view similar to FIG. 9 and illustrates the apparatus of FIG. 9 after the step of applying heat and pressure thereto to final form the belt construction of this invention.

Subsequently, the layer of material 15A in a noncured form thereof, if used, is now disposed or wrapped on top of the tensile means 13 and polymeric material 16 in the manner illustrated in FIG. 9. Thereafter, the second polymeric material 15 is disposed or wrapped on top of the layer 15A and then the drum 41 with the materials 15 and 15A thereon in the manner illustrated in FIG. 9 is disposed back into the container 49. The diaphragm 58 is now disposed against the outer surface 70 of the material 15 so that a subsequent heating and pressing operation can be provided in the container 49 to cause the materials 15, 15A and 16, as well as the cover material 36, to be forced toward the drum 41 to cause the material 15A to embed into the tensile means 13 and completely mate with the surface 60 of the material and cause the material 16 and cover 36 to substantially fill out all remaining voids 66 in the grooves 42 to completely form the teeth 14. In addition, the heat and pressure is maintained in the container 49 for a sufficient period of time to cause the material 16, 15A and 15 to cure together and form the interface line 24 as previously set forth. Also, at this time, the cover 36 fully bonds to the material 16 of the teeth 14.

It is believed according to the teachings of this invention that since the material 16 is in generally a non-cured condition, as well as the cover 36, when the material 15A is being forced against the same to complete the forming of the teeth 14, the material 15A bonds or adheres to the material 16 to a greater degree when the material 16 is in a generally non-cured condition than when the same is in a more cured condition at the time the material 15A is being heated and pressed against the material 16 for this purpose.

Of course, if the layer 15A is not utilized, then the layer 15 will bond to the surface 60 of the layer 16.

Once the materials 15, 15A, 16 and 36 have been completely cured in the manner previously set forth, the drum 41 is removed from the container 49 and the belt construction 10 is then removed from the drum 41 and further processed in a conventional manner.

For example, if the belt construction 10 comprises an elongated belt sleeve as previously described and illustrated in the drawings, the same can be cut into the individual endless belts in a conventional manner whereby such operation need not be further described.

Therefore, it can be seen that this invention not only provides an improved belt construction, but also this invention provides an improved method of making such a belt construction.

While the particular material of the belt construction 10 of this invention can be selected so that the same will provide a suitable belt construction 10 when made according to the method of this invention, one such belt construction that has been successfully made by this invention comprises a synchronous belt for a motorcycle final drive. Such belt has a thickness of approximately 0.300 to 0.400 of an inch, each tooth 14 having a base width of approximately 0.312 of an inch, a depth of approximately 0.185 of an inch, each side 18 and 19 being angled at approximately 9 degrees relative to the center line of the respective tooth 14, a root radius of approximately 0.050 of an inch and a bottom radius of approximately 0.070 of an inch. The polymeric material 16 of such belt comprises a neoprene rubber loaded with nylon fibers of relatively short length and being approximately 40 parts fiber per 100 parts rubber (40 PHR), such fibers having a diameter in the approximate range of 0.001 to 0.050 of an inch and a length in the approximate range of 0.001 of an inch to as much as 1 inch, the material 16 having a Mooney minimum of approximately 19.5 at 275° F. and an original gauge or thickness of approximately 0.130 of an inch. The ply 15A was formed of the same material as the layer 16 and had an original gauge of approximately 0.060 of an inch. The material 15 of such belt comprises a neoprene gum stock which is substantially free of fibers therein and has a Mooney minimum of approximately 9.5 at 275° F. with an original gauge or thickness of approximately 0.050 of an inch. The fabric cover 36 for such belt is a stretchable RFL (resorcinal formaldehyde latex) treated nylon fabric which has a raw fabric weight of approximately 10½ to 12 ounces per square yard thereof. It was found that the nylon fabric required an RFL treatment so as to have a lower curing rate over other coated fabric material so that the teeth 14 will fully form according to the teachings of this invention in the manner previously set forth. The tensile means 13 for such a belt construction comprises a fiberglass cord 140 Tex 1/3/12 having a diameter of approximately 0.082 of an inch and such cord is wrapped so as to provide approximately 8 cords per inch across the face of the drum 41. The shrinkable cord 43 that was removed after forming the grooves 43' comprises a greige or raw unprocessed polyester cord that had an effective diameter of approximately 0.082 of an inch.

When forming such a belt construction, the drum 41 and its associated materials 43, 16 and 36 utilize approximately a 5 minute warmup time in the tank 49 wherein the steam pressure inside the drum 41 is approximately 50 psi and the steam pressure outside the drum 41 is approximately 120 psi. This is followed by approximately a 5 minute forming cycle of heat and pressure wherein the outside steam pressure is approximately 120 psi with the inside pressure being approximately 0 psi. The drum 41 and its associated materials 43, 16 and 36 is then placed in the cooling bath 67 for approximately 10 minutes. Thereafter, the final curing operation of the cooled drum 41 in the tank 49 with the means 43 removed and the materials 15, 15A and 13 applied has an outside steam pressure of approximately 75 psi and an inside pressure of approximately 0 psi for about 10 minutes followed by the outside steam pressure being approximately 120 psi and the inside steam pressure being approximately 0 psi for about 5 minutes followed by the outside steam pressure being approximately 120 psi and the inside steam pressure being approximately 50 psi for about 45 minutes whereby the total final cure time is about 60 minutes.

Therefore, it can be seen that by following the teachings of this invention a high modulus high Mooney compound can be successfully formed into a synchronous belt by preforming the teeth on a mold or drum before the application of a tensile means and a gummed backing material.

For example, in the aforementioned example, the high modulus material 16, approximately 5,000 psi at 50% elongation, was made to make a synchronous belt for a motorcycle final drive and tests show a standard belt to deflect and jump teeth in less than 20 jam cycles whereas the belts of this invention were run at least 6000 cycles without jumping and shearing and when removed therefrom, little wear thereon was noticed.

It is to be understood that the above specific example of a particular belt construction 10 formed according to the teachings of this invention is not to be a limitation on this invention but is merely for the purpose of illustrating how one such belt construction was formed according to the teachings of this invention.

For example, it is believed that other high modulus materials, such as thermoplastic materials, could be utilized in combination with backing members of lower modulus material in the method of this invention to form toothed belt constructions. Of course each material would probably need different forming times, temperatures and pressures.

Therefore, it can be seen that this invention not only provides an improved belt construction, but also this invention provides an improved method of making such a belt construction or the like.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a method of making a belt construction having opposed sides and comprising a plurality of teeth defining one of said opposed sides of said belt construction and being mainly formed of a first polymeric material that has reinforcing fibers therein, each tooth having opposed sides that are disposed in spaced relation to adjacent sides of adjacent teeth, said belt construction having a land area between adjacent teeth, and a backing member defining the other of said opposed sides of said belt construction, said backing member being mainly formed from a second polymeric material that is initially separate from said material of said teeth, said method comprising the steps of providing a grooved drum, disposing said first polymeric material in a non-cured form thereof about said drum and then subjecting said drum with said first material thereon to heat and pressure to cause said first material to be forced toward said drum and exude into said grooves to at least partially form said teeth, the improvement comprising the steps of then substantially immediately force cooling said first material and said drum to a certain temperature to stop the curing of said first material so that said first material is generally in a less cured condition thereof than a cured condition thereof if said drum with said first material thereon had been permitted to cool to said certain temperature at a normal rate by being disposed in substantially static air of substantially normal room temperature, then disposing said second material in a non-cured form thereof about said first material on said drum, and then subjecting said drum with said first and second materials thereon to heat and pressure to cause said first and second materials to be forced toward said drum to complete any remaining unfinished portion of said teeth and be cured together to form said belt construction.

2. A method as set forth in claim 1 wherein said step of substantially immediately force cooling said first material and said drum comprises the step of disposing said drum with said first material thereon into a bath of a cooling fluid.

3. A method as set forth in claim 2 wherein said cooling fluid comprises water.

4. A method as set forth in claim 3 wherein the temperature of said water is approximately room temperature before said drum with said first material thereon is disposed therein.

5. A method as set forth in claim 1 wherein said step of substantially immediately force cooling said first material and said drum cools the same to at least approximately 140° F. to substantially stop any further curing of said first material that was started by said step of subjecting said drum to heat and pressure whereby said certain temperature is approximately 140° F.

6. A method as set forth in claim 1 wherein said second material is substantially free of fibers therein.

7. A method as set forth in claim 1 and including the step of disposing a stretchable fabric layer about said drum before said step of disposing said first material about said drum so that said fabric layer will be subsequently forced into said grooves and be bonded to said teeth.

8. A method as set forth in claim 1 and including the step of forming said second polymeric material to comprise two separate layers of superimposed polymeric material disposed about said drum.

9. A method as set forth in claim 8 and including the step of forming one of said two layers of said second polymeric material to be thinner than the other layer thereof.

10. A method as set forth in claim 9 and including the step of forming said one layer of said second polymeric material to be a different polymeric material than the polymeric material of said other layer thereof.

11. A method as set forth in claim 10 and including the step of disposing said one layer of said second polymeric material to be adjacent said first polymeric material.

* * * * *